United States Patent
Rous

(10) Patent No.: US 9,105,097 B2
(45) Date of Patent: Aug. 11, 2015

(54) METHOD FOR DETERMINING RELATIVE MOTION WITH THE AID OF AN HDR CAMERA

(75) Inventor: Martin Rous, Mundelsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 480 days.

(21) Appl. No.: 13/518,359

(22) PCT Filed: Dec. 23, 2010

(86) PCT No.: PCT/EP2010/070699
§ 371 (c)(1),
(2), (4) Date: Aug. 30, 2012

(87) PCT Pub. No.: WO2011/076939
PCT Pub. Date: Jun. 30, 2011

(65) Prior Publication Data
US 2012/0321133 A1 Dec. 20, 2012

(30) Foreign Application Priority Data
Dec. 23, 2009 (DE) .......................... 10 2009 055 269

(51) Int. Cl.
*G06K 9/00* (2006.01)
*G06T 7/20* (2006.01)

(52) U.S. Cl.
CPC ......... *G06T 7/20* (2013.01); *G06T 2207/20208* (2013.01)

(58) Field of Classification Search
CPC ............................................ G06T 2207/20208
See application file for complete search history.

(56) References Cited

U.S. PATENT DOCUMENTS

2006/0078165 A1 4/2006 Watanabe

FOREIGN PATENT DOCUMENTS

| CN | 101064837 | 10/2007 |
| DE | 103 01 898 | 8/2004 |
| DE | 10 2006 027 121 | 12/2007 |

OTHER PUBLICATIONS

International Search Report for PCT/EP2010/070699, dated Mar. 30, 2011.
M. Celestino and O. Horikawa: "Velocity Measurement Based on Image Blur," ABCM Symposium Series in Mechatronics—Proceeding, Brazilian Society of Mechanical Sciences and Engineering, vol. 3, pp. 633-642, 2008.
Okamoto, F. et al.: "A CMOS Imager With New Focal-Plane Motion Detectors," 1999 Symposium on VLSI Circuits. Digest of Technical Papers. Kyoto, Jun. 17-19, 1999; [Symposium on VLSI Circuits], New York, NY: IEEE, US, vol. Conf. 13, Jun. 17, 1999, p. 139/140, XP000894788.
Rhee, Jehyuk et al.: "Wide Dynamic Range CMOS Image Sensor With Pixel Level ADC," Electronics Letters, IEE Stevenage, GB, vol. 39, No. 4, Feb. 20, 2003, pp. 360-361, XP006019873.
Linan-Cembrano, Gustavo et al.: "Insect-Vision Inspired Collision Warning Vision Processor for Automobiles," IEEE Circuits and Systems Magazine, Second Qtr. 2008, pp. 6-24.

*Primary Examiner* — Stephen R Koziol
*Assistant Examiner* — Raphael Schwartz
(74) *Attorney, Agent, or Firm* — Kenyon & Kenyon LLP

(57) ABSTRACT

In a method for detecting a motion of an object with the aid of an image recording system (e.g., HDR camera) which includes an image sensor, a first reset and a second reset are performed at a time interval during the exposure of the image sensor, an extent of a region of constant brightness is measured from the image of an object, and the motion (direction, velocity, and optionally acceleration) of the object is ascertained from the relationship between the measured extent and the time interval between the first and second resets. This motion determination is achieved with the aid of a single image.

7 Claims, 3 Drawing Sheets

METHOD FOR DETERMINING RELATIVE MOTION WITH THE AID OF AN HDR CAMERA

BACKGROUND OF THE INVENTION

1. Field of the Invention

The present invention relates to a method for determining relative motion with the aid of a camera.

2. Description of the Related Art

It is already known to use an image recording system in a motor vehicle in order to obtain images of the vehicle's surroundings and, in combination with a driver assistance system, to facilitate the driving of the vehicle. An image recording system of this type includes at least one image sensor and one optical system associated with this image sensor, which maps a recorded field of the vehicle's surroundings onto the image sensor. The image sensor used in an image recording system of this type must process a broad range of different illumination levels in order to be able to deliver a usable output signal both in blazing sun and in poorly illuminated tunnels. While in the case of a conventional image sensor exposure sensitivity often follows a fixedly adjusted linear or logarithmic characteristics curve, image sensors have already been proposed (published German patent application document DE 103 01 898 A1 and published German patent application document DE 10 2006 027 121 A1) in which individual linear segments of this characteristics curve are individually adjustable. A characteristics curve of this type relates the absolute brightness of an object to the grayscale value in the image obtained from the object.

From the article "Velocity measurement based on image blur" by M. Celestiono and O. Horikawa in ABCM Symposium Series in Mechatronics, Vol. 3, pp. 633-642, 2008, it is furthermore known to measure the velocity of a vehicle over the ground in order to check the reliability performance of the tachometer. For this purpose, an image of the road segment traveled by the vehicle is detected by an image sensor which is integrated into the vehicle, and the detected image is compared with a previously recorded image. Velocity information is derived from the image blurred as a function of the velocity.

BRIEF SUMMARY OF THE INVENTION

An improved method (and device) is proposed for detecting an object, in particular in the traffic zone of a vehicle, which makes it possible to determine the relative motion (relative velocity and/or a relative direction of motion) of an object in the image relative to the motion of the camera (for example, between an ego-vehicle and objects in the traffic zone) faster than previously, since the motion may be ascertained even from one image (frame), and having at least two images is no longer required.

Motion (for example, of a vehicle) is understood as its velocity and direction, which thus represent motion parameters. Similarly, a change in motion is composed of a change in direction and/or a change in velocity. Of course, a motion parameter or its derivative (the change in the motion parameter) may also have the value zero. In this case, the (change in) motion would be similarly describable only from the (change in) velocity or (change in) direction, for example.

The need for having to evaluate, as rapidly as possible, whether an accident risk is present may be used as a case of application of the faster detection of the relative motion, for example, since a collision risk, for example, cannot be ruled out on the basis of the position and relative velocity of an object. This makes it possible to take timely countermeasures to mitigate the risk.

The method according to the present invention is very accurate, since, for example, clearer incremental position determinations of objects are possible due to the sharply delimited edges (as explained below) in the image than when using methods working with motion blur, for example.

DETAILED DESCRIPTION OF THE INVENTION

For the motion analysis of images of an image recording system, an image sequence composed of multiple images is considered in order to determine the motion of an object from the vehicle's surroundings, in particular its relative velocity. In this case, a so-called motion vector is ascertained, which specifies the motion in the image sequence in question in image coordinates (pixels). If the frame rate, as a time constant, is known, a relative motion over multiple images may be estimated therefrom. The accuracy with which the relative motion may be determined is a function of the pixel resolution (granularity) in this case.

With the aid of images from an HDR (High Dynamic Range) camera, whose image sensor normally has a characteristics curve structure having linear segments, approximating a logarithmic characteristics curve, a novel method described herein may be used in order to estimate the relative motion by recording only one single image. According to the present invention, it is critical that the characteristics curve of the camera has at least one or multiple break point(s) (i.e., non-differentiable points).

An HDR camera works, for example, as follows:

During the exposure time ("integration start" to "readout" (readout of the pixel value (brightness)), different reset points in time are set. When a reset occurs, all light-sensitive elements (pixels) which have exceeded a certain defined brightness value (i.e., whose potential threatens to reach saturation (overexposure)) are reset to a certain constant value. The constant value to which reset occurs is different (in ascending order) depending on the number of resets (four in FIG. 3) and corresponds to stages Roman I through IV.

Assuming that the light effect (amount of light) during the entire exposure time remains constant and does not change between the reset points in time, a different intensity is obtained, despite the reset of the pixels of different potentials to the same value, corresponding to the characteristics curve, since the different light effect may continue to act after the last reset and then becomes visible during the final readout.

It is unimportant for the present invention whether the potential well of the pixels is filled or, on the contrary, emptied during the exposure.

Figure 2:
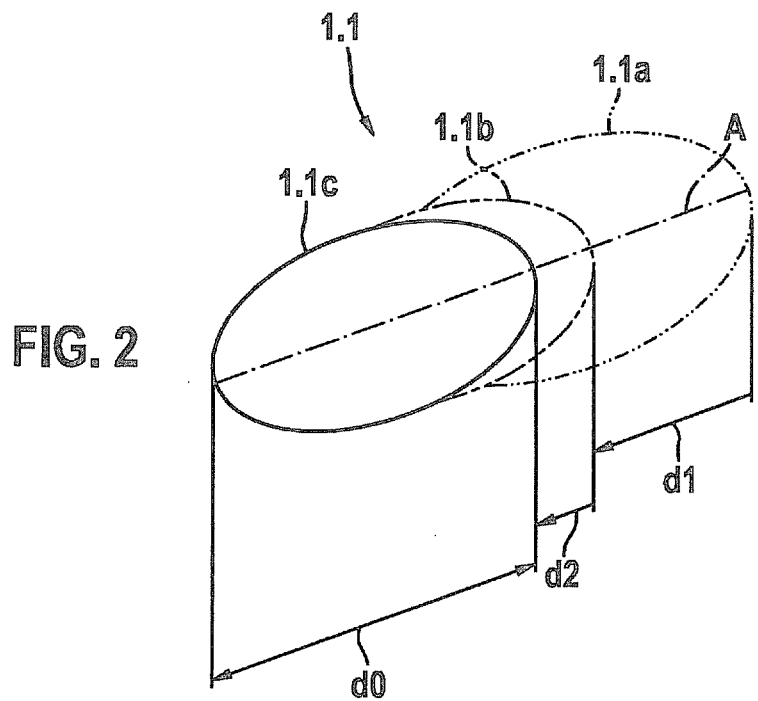
FIG. 2 shows an enlarged illustration of a partial region of the detected object.

However, if it is detected that motions in the image during exposure time admittedly result in the above-mentioned assumption of uniform light effect no longer being valid, the following effect occurs, which may be used according to the present invention:

The object having a relative motion (in the present example headlight 1.1) illuminates the pixels of the camera in position 1.1a in the period between the start of exposure and reset 1. Due to the high light intensity of the headlights, at the point in time of the first reset, the pixel is reduced to a level BP1. During the time period until the next reset, the headlight illuminates the pixels in position 1.1b. The second reset results in the pixel value being reduced to the level BP2, which is higher, and thus region 1.1b in the image appears to be brighter than region 1.1a. The same applies to the third reset, which results in an even brighter region 1.1c, since level BP3 reduced there is even higher. The edges or steps between the regions (1.1a, b, c) having the same (and possibly constant) brightness, visible in FIG. 2, are obtained as an effect. Although in the last region (1.1c) a greater brightness would be visible, under certain circumstances, than in 1.1b, if this region was illuminated after the last reset (immediately before readout), there would be no constant brightness (except if the region was nevertheless overexposed). This does not necessarily apply in the case of homogeneous light sources, since in that case also the same grayscale value may be present in an image region even in the absence of overexposure.

For the method to work, the brightness of an object must be high enough so that at least at one point in time the brightness value of the pixels must be high enough for reset to occur, i.e., it must be higher than brightness threshold BP1. This is often the case even with self-luminous objects.

In the automotive surroundings these are, for example, headlights of other vehicles. For many applications, their motion, in particular, is to be preferably determined, even more so than that of other objects, in particular of less dangerous (objects not representing a collision risk) or stationary objects.

The extent of the regions of constant brightness (1.1a, b, c) in the image may now be measured for the particular brightness levels BPx or, formulated more precisely, the distances of the brightness transitions (edges) may be measured, which in the example results in distances d0, d1, d2. In this case, the relationship of the distances corresponds to the relationship of the time intervals between reset points in time. Since therefore the traveled distance (e.g., d1) between two reset points in time (e.g. "Integration start" to Reset 1) is known, the velocity of the object may be determined with the aid of the known formula $$v = \frac{d}{\Delta t_{reset}} 1$$

A linear, uniform motion of the object is assumed here, which is sufficient for the normally short exposure times.

Knowing the shape of the known characteristics curve, points in time BP1, BP2, BP3, BP4 within an image of the image sensor are obtained, which correspond to the points in time of the reset pulses of the break points of the characteristics curve. Depending on the number of break points (or knee points), it is possible to perform a check or plausibility check of the determined value of the relative velocity. The above-described method may be performed as many times as the number of reset points, and the velocity may be calculated. The results must be identical for uniform motion if optical effects or other objects/light sources cause no interference.

It is claimed that the origin of the characteristics curve, i.e., the start of exposure (Full Reset) is also considered a break point, i.e., the method according to the present invention may also be performed using the time difference between start of exposure and first reset.

The extent of the regions having constant brightness refers to the possible extent in all directions in the image plane. To use the method, normally a preferred direction is determined and the distances of the region of constant brightness are determined in this direction. Preferred direction is the direction having the greatest distance of the total extent of all portions of the image of the object put together (i.e., superset of 1.1a+1.1b+1.1c). This is the direction in which the object moves in the image plane. This direction is also selected for the distances in FIG. 2.

Of course, evaluation in another direction or evaluation of multiple directions is also possible, for example, one in the x direction and one in the y direction, so that a division into the x and y motion components is obtained.

As an extension of the idea according to the present invention, in the presence of multiple distance ratios (d1, . . . dn) (not starting with d0, since d0 is the dimension of the light source itself) in the image, instead of the plausibility check, detection of a change in the motion of the object (taking into account a possible change in the motion of the possibly moved camera) may also be performed.

The following description of the figures expressly refers to the example of an application for a vehicle. The application possibilities, however, are not limited thereto, but numerous other possibilities may be considered as further examples: Motion detection of persons, person monitoring systems, motion detection on conveyer belts. The camera needed may be used in on-board or also in stationary systems. The location of the image evaluation does not need to correspond to that of the camera and may take place, for example, in spatially separated computers.

Figure 1:
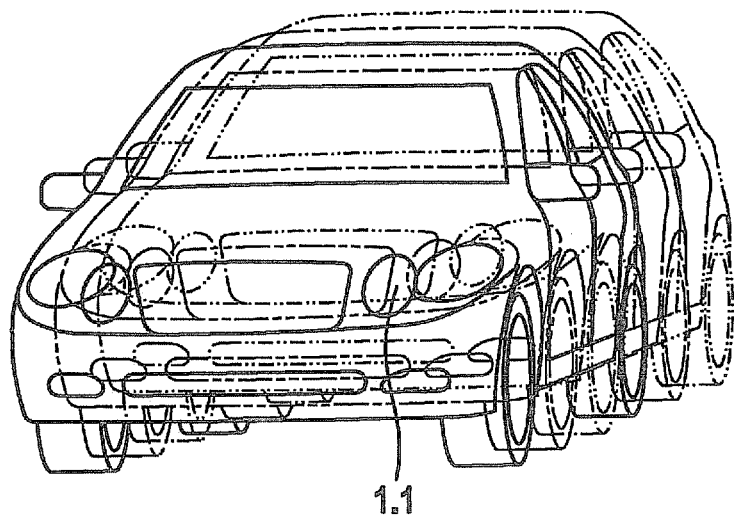
FIG. 1 shows the image of an object detected in the traffic zone.

FIG. 1 shows a scene from the ego-vehicle's surroundings recorded using an on-board image recording system of the ego-vehicle (not illustrated). The image recorded in the dark shows an object from the ego-vehicle's surroundings detected by the image recording system, namely another vehicle moving relative to the ego-vehicle, whose contours are fuzzy due to motion blur. The other vehicle moves with its headlights on. In the following, only headlight 1.1 of the other vehicle detected by the image recording system of the ego-vehicle will be discussed. The image of this headlight 1.1 detected by the image sensor of the image recording system is shown enlarged in FIG. 2. Segment d0 represents the extent of this light source along an axis A. At a first point in time t1, headlight 1.1 detected as a light source was in position 1.1a. At a second point in time t2 the headlight was in position 1.1b. At a third point in time t3 headlight 1.1 was in position 1.1c. In the time interval t1-t2 the image of headlight 1.1 was thus displaced by distance d1. In the next time interval t2-t3 the image of headlight 1.1 was thus displaced by distance d2. Since normally the image recording system detects the ego-vehicle's surroundings at an image sequence frequency of 25 images per second, for example, a single image is recorded in approximately 40 msec. The motion of the other vehicle carrying headlight 1.1 may be derived from the length of distance d1 and the time period for traveling this distance d1. A similar derivation is possible by evaluating distance d2. A plausibility check of the measured value for vehicle motion initially ascertained is thus possible. In this discussion, it is understood that the motion of the other vehicle did not undergo any substantial change during the time for constructing a single image, i.e., during approximately 40 msec.

To effectively determine the relative motion, it is necessary that an object from the vehicle's surroundings detected by the image sensor of the on-board image recording system has a bright image structure, which makes calculation along the extent of the object at the break points of the characteristics curve possible.

Determining the motion blur is to be considered an advantageous further application. The determination of the motion blur may be checked using the known structure of the particular characteristics curve used in each case. In particular, the direction of motion may be derived from the main direction of the motion blur.

Using the method according to the present invention for determining the motion of an object, the direction, velocity, and/or the degree (intensity) may be determined, which possibly also generate motion blur in the image. This knowledge may be used, for example, for using filters (for the image data) which reduce the blur, for example. These filters may be then supplied with suitable parameters from the results according to the present invention and thus deliver better results.

Figure 3:
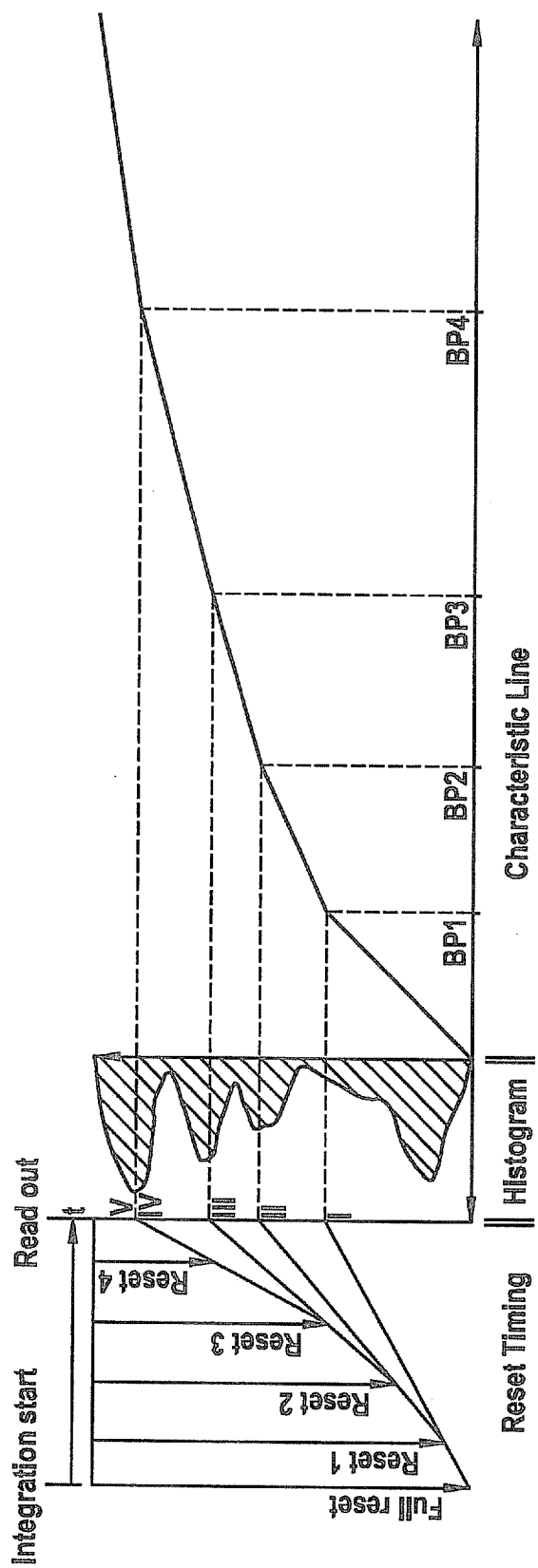
FIG. 3 shows a characteristics curve of the image sensor of an image recording system.

FIG. 3 is an illustration of the relationship between the activation of the image sensor of the image recording system and the resulting shape of the characteristics curve. The time control of the image sensor is reproduced in the left-hand region of the illustration. Five recording intervals are shown, which are separated by the reset points in time Full Reset, Reset 1, Reset 2, Reset 3, and Reset 4. In the central region of the illustration, the grayscale values ascertained in the recording intervals are shown as a histogram. The characteristics curve of the image recording sensor is reproduced in the right-hand region of the illustration, the abscissa representing the original (optical) relinearized grayscale value and the ordinate representing the compressed grayscale value, i.e., the (digitized) readout value from the image sensor.

The characteristics curve relates the absolute (actual) brightness of an object with the grayscale value of the image obtained from the object. Due to the fact that segments of the characteristics curve are linear having different slopes, different exposure times are obtained for the corresponding object brightnesses. The compression of the original grayscale value in the image increases relative to the digitized value with each additional break point of the characteristics curve.

The number of break points/resets in this FIG. 3 is higher than that corresponding to the object shown in FIG. 2. For the latter only Full Reset, Reset 1, Reset 2, and Readout would be needed. According to this figure, the time intervals between Reset 1 and Reset 2 would be smaller than those between Full Reset and Reset 1, since the respective extent of d2 is smaller than that of d1. This is true for the assumed uniform motions.

If this image (FIG. 2) were recorded at the same time interval of the resets, the image would indicate a strong delay of the object during the recording/exposure, since a shorter distance (d2) was traveled in the second time interval than the distance (d1) in the first time interval.

Figure 4B:
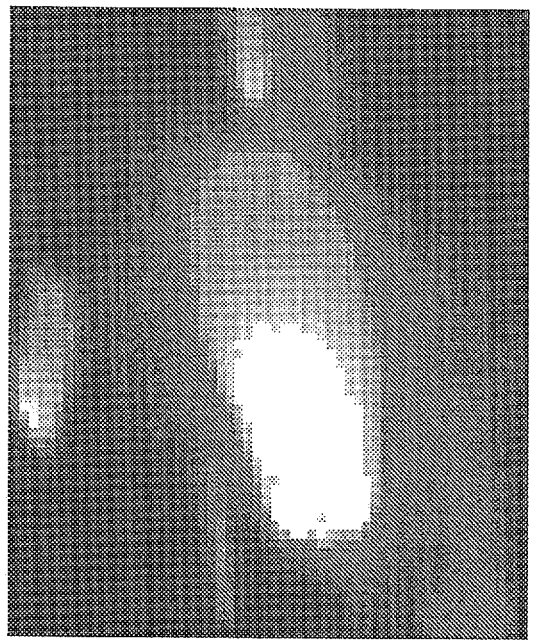
FIG. 4b shows the headlight of the vehicle enlarged.
Figure 4A:
FIG. 4a shows an image of a vehicle recorded by the camera.

FIG. 4 shows an image recorded by the camera (FIG. 4a), which shows a vehicle whose headlight is shown enlarged in FIG. 4b. This image is used for illustration, and the skilled viewer recognizes the nuances and the regions of equal brightness which are made possible by the method according to the present invention. FIG. 2 shows the contours of the nuances from FIG. 4 and the determination of the direction of motion and dimensions (d0, d1, d2) of the regions of equal brightness.

Furthermore, the following subject matters are described:

Detection of an object using an image recording system which includes an image sensor, the image sensor having a controllable characteristics curve and the image sensor being controlled in such a way that different segments of the characteristics curve of the image sensor are effective while an image is being constructed, an object being detected at a first point in time by a first segment of the characteristics curve of the image sensor, and at a second point in time by a second segment of the characteristics curve of the image sensor.

In another embodiment, the position of the object in the image is detected at the first point in time, and the position of the object in the image is detected at the second point in time, and the relative motion of the object is derived from the distance of the image positions of the object.

In another embodiment, the position of the object in the image is detected at at least one additional third point in time and a change in the relative motion of the object is derived from the at least one additional distance of the image positions of the object.

In another embodiment, a plausibility check of the detected measured values or of the quantities derived from the measured values is made possible by comparing the measured values detected at a first point in time and at a second point in time.

What is claimed is:

1. A method for detecting a motion of an object using an image recording system which includes an image sensor, comprising:

performing a first reset and a second reset at a first time interval during an exposure of the image sensor;

measuring a first extent of a first region of constant brightness from an image of an object detected by the image sensor;

and ascertaining the motion of the object at a first point in time from a relationship between (i) the measured first extent and (ii) the first time interval between the first and second resets;

wherein the motion of the object is ascertained from a single image;

performing at least one third reset at an additional time interval during the exposure of the image sensor;

measuring a second extent of a second region of constant brightness from the image of the object;

and ascertaining the motion of the object at an additional point in time from a relationship between (i) the measured second extent and (ii) the additional time interval between the second reset and the third reset;

wherein a change in the motion of the object is determined based on the motion of the object at the first point in time and the motion of the object at the additional point in time.

2. A method for detecting a motion of an object using an image recording system which includes an image sensor, comprising:

performing a first reset and a second reset at a first time interval during an exposure of the image sensor;

measuring a first extent of a first region of constant brightness from an image of an object detected by the image sensor;

and ascertaining the motion of the object at a first point in time from a relationship between (i) the measured first extent and (ii) the first time interval between the first and second resets;

wherein the motion of the object is ascertained from a single image;

performing at least one third reset at an additional time interval during the exposure of the image sensor;

measuring a second extent of a second region of constant brightness from the image of the object;

ascertaining the motion of the object at an additional point in time from a relationship between (i) the measured second extent and (ii) the additional time interval between the second reset and the third reset; and verifying the motion of the object.

3. The method as recited in claim 1, wherein a main direction of a motion blur is ascertained.

4. The method as recited in claim 1, wherein the object is a headlight of a vehicle.

5. A device for detecting a motion of an object, comprising:

an image recording system which includes at least one image sensor having a characteristics curve which has break points;

wherein the image recording system measures an extent of a region of constant brightness from an image of an object detected by the image sensor; and wherein the image recording system ascertains a motion of the object at a first point in time from a relationship between (i) the measured extent and (ii) time intervals between the break points;

wherein the motion of the object is ascertained from a single image;

wherein the image recording system measures a second extent of a second region of constant brightness from the image of the object; and wherein the image recording system ascertains the motion of the object at an additional point in time from a relationship between (i) the measured second extent and (ii) the additional time interval between additional break points;

wherein a change in the motion of the object is determined based on the motion of the object at the first point in time and the motion of the object at the additional point in time.

6. The device as recited in claim 5, wherein the characteristics curve has at least two break points.

7. The device as recited in claim 6, wherein the image recording system includes a high-dynamic-range camera.

\* \* \* \* \*